T. W. Pratt.
Vault Cover.
Nº 50,387.    Patented Oct. 10, 1865.
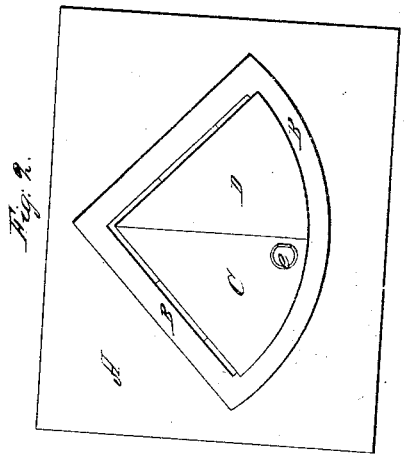
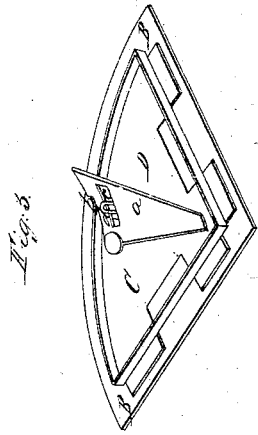
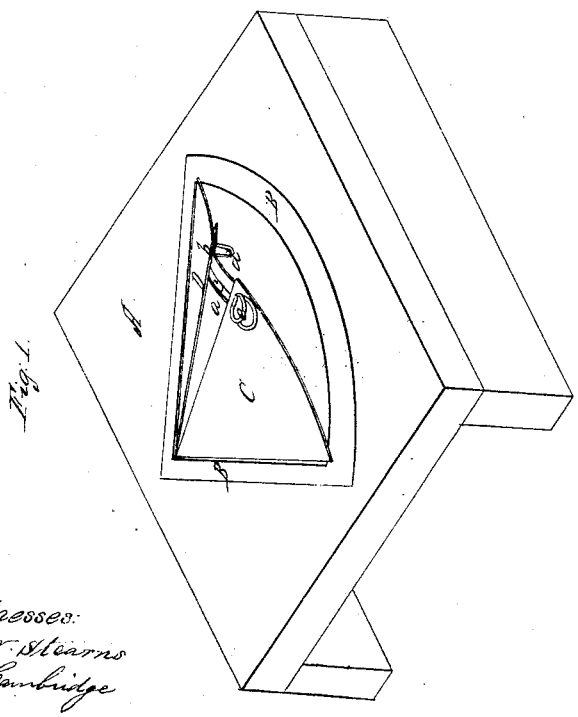
Witnesses:
N. W. Stearns
W. J. Cambridge
Inventor:
T. Willis Pratt

UNITED STATES PATENT OFFICE.

T. WILLIS PRATT, OF BOSTON, MASSACHUSETTS.

IMPROVEMENT IN SAFETY COAL-TRAPS.

Specification forming part of Letters Patent No. 50,387, dated October 10, 1865.

*To all whom it may concern:*

Be it known that I, T. WILLIS PRATT, of Boston, in the county of Suffolk and State of Massachusetts, have invented an Improved Safety Coal-Trap, of which the following is a full, clear, and exact description, reference being had to the accompanying drawings, making part of this specification, in which—

Figure 1 is a perspective view of my improved coal-trap secured in place within a sidewalk when open and ready for use. Fig. 2 is a plan of the same when closed. Fig. 3 is a view of the under side of my coal-trap when closed.

The lids or covers, placed in the sidewalk to close the aperture to the vault beneath, and generally known as "coal-traps" or "vault-covers," as heretofore constructed, have been found objectionable for the following reasons: Where the cover is made in a single piece and hinged to one side, when it is left open the hole to the vault beneath is not sufficiently guarded on all sides to prevent the liability of pedestrians stepping into it and being injured, and those covers which, when open, are supported vertically over their apertures in the sidewalk are also objectionable on account of people coming into collision with them and being thrown down.

To remove the above-mentioned difficulties is the object of my invention, which consists in a coal-trap provided with lids hinged to the sides of a frame placed in the sidewalk, one of the lids having a flap extending under the other lid, and having a notch or projection on its outer edge, into which the edge of the other lid catches, thus holding the trap open, the aperture formed by the open trap being toward the street, and the surfaces presented to the pedestrian being smooth and inclined to each other, forming a roof over the vault-hole and avoiding the occurrence of the dangers incident to other descriptions of coal-traps.

To enable others skilled in the art to understand and use my invention, I will now proceed to describe the manner in which I have carried it out.

In the said drawings, A represents the pavement, into which, and flush with its surface, is fitted the frame B in the form of a quadrant. To each of the inner straight portions of the frame B is hinged a segmental lid of about forty-five degrees. To the segment C is securely fastened a metal flap, $a$, of the form of a portion of the outer surface of a cone, the plane of the under side of the segment C being tangent to its curvature throughout its length. In the outer or curved edge of the flap $a$ is cut a notch, $b$, into which falls the edge of the straight portion of the other segment, D, when the coal-trap is open.

$c$ is a slot cut in the flap $a$, through which passes a hook or staple, $d$, projecting from the under side of the segment D, to which a chain may be fastened to hold it down securely when closed.

To the segment C is fastened a ring, $e$, by which it may be raised when the trap is to be opened.

The trap is placed near the edge-stone, and the aperture formed, when it is open, faces toward the street, thereby facilitating the entrance of the coal to the vault. The parts being in the position shown in Fig. 2, and it being required to open the trap, the segment C is raised by the ring $e$, while the segment D is simultaneously raised by the curved flap $a$ extending under it until its inner straight edge drops into the notch $b$, in which position it is retained by the weight of the segment D while the coal or other article is being passed down into the vault.

When required to ventilate the vault the trap may be kept open by a block placed under the curved edge of the segment C.

The trap may be closed by simply lifting the segment D until its inner edge is liberated from the notch $b$, when the two segments are lowered by the ring $e$ and kept shut by any suitable fastening.

The flap $a$, instead of being secured to the segment C, may be secured to the segment D, in which case the staple $d$ would project from the under side of the segment C; and, instead of the two lids and frame being segmental, they may be of a rectangular form, if desired, without departing from the spirit of my invention.

By the employment of the above-described coal-trap, perfect security against accident is afforded, while the simplicity of its construction admits of its being operated in a convenient and expeditious manner.

What I claim as my invention, and desire to secure by Letters Patent, is—

A coal-trap consisting of two lids, C D, hinged to the frame A, in combination with a flap, a, which extends under one of them when closed and forms a support for both lids when open, substantially as and for the purpose set forth.

T. WILLIS PRATT.

Witnesses:
N. W. STEARNS,
W. J. CAMBRIDGE.